United States Patent Office 3,525,902
Patented Aug. 25, 1970

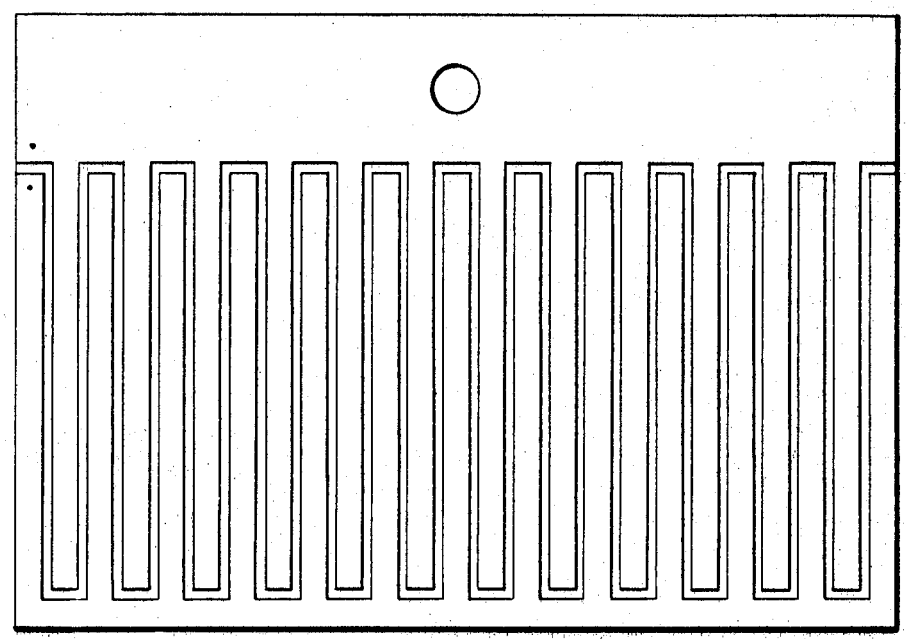
Fig-3
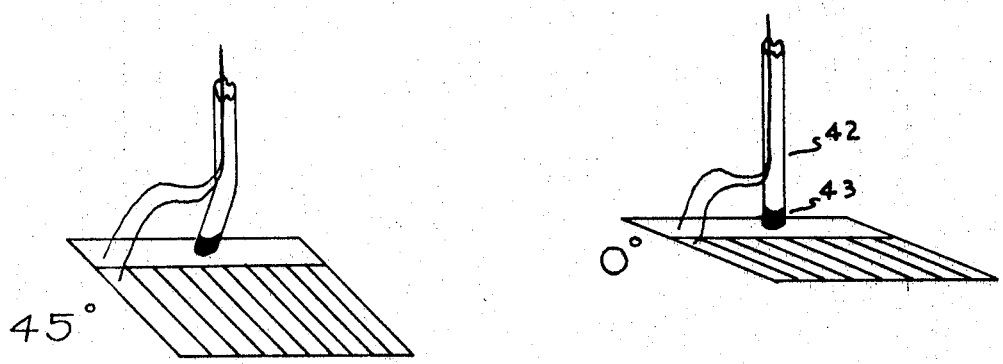
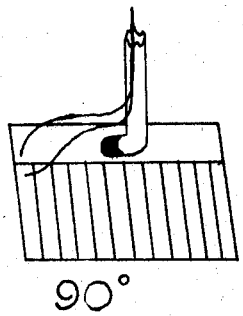
Fig-4
INVENTOR.
FRANK A. DAVIDSON
ROBERT L. PRICKETT
JACK R. SCHMERMUND

3,525,902
WATER SENSING SAFETY CONTROL FOR HIGH VOLTAGE ELECTRICAL EQUIPMENT
Frank A. Davidson, Fairborn, and Robert L. Prickett and Jack R. Schmermund, Dayton, Ohio, assignors to the United States of America as represented by the Secretary of the Air Force
Filed Aug. 17, 1967, Ser. No. 661,481
Int. Cl. H02h 3/00
U.S. Cl. 317—9    3 Claims

ABSTRACT OF THE DISCLOSURE

Safety apparatus for anticipating and preventing equipment damage and conditions hazardous to personnel due to the entry of water into an area containing high voltage equipment. Electrical water sensors, each in the form of a pair of interdigitated electrodes on an insulating substrate having very high interelectrode resistance when dry but relatively low resistance when the electrodes are bridged by water, are situated at points of likely water entry into the area. The sensors together with a source of direct current are connected in the base-emitter circuit of a transistor. Current flow from the direct current source through any sensor produces a relatively large transistor collector current which is utilized in an appropriate circuit to deenergize the high voltage equipment by disconnecting it from its primary power source. The disconnection is maintained until the circuit is manually reset after the water hazard has been removed.

The invention described herein may be manufactured and used by or for the United States Government for governmental purposes without the payment to us of any royalties thereon.

---

This invention relates to the field of safety control devices and more specifically to electronically controlled safety devices. Still more specifically it pertains to a water sensing, electronic safety control device for use with high voltage electrical equipment for the purpose of shutting down said equipment in the presence of water to protect operating personnel from possible electrical shock or electrocution and to protect the equipment from damage due to electrical shorting.

Many safety devices and interlocks are designed and built into high voltage electrical equipment to protect both operating personnel and the equipment itself from damage or injury. These safety devices are such as door pressure switches, system pressure switches, temperature control interlocks and control position interlocks. These safety devices serve their function of protecting personnel and equipment under normal operating conditions. However, said high voltage electrical equipment has been highly vulnerable to water from outside sources such as leaking roofs, actuated overhead sprinkler system, ruptured water lines or sudden flooding of equipment rooms. Water, from sources such as these, has caused electrical short circuiting in high voltage electrical equipment with subsequent injury and death to operating personnel and damage or total loss of equipment.

The water sensing safety control system constituting this invention, and to be disclosed, has been found to be very reliable and efficient in eliminating the dangers to personnel and equipment caused by the influx of water into the area of high voltage electrical equipment by shutting off the electrical power being supplied to said high voltage electrical equipment the instant the water begins to enter the area.

It is an object of this invention to provide a water sensing electronic safety control device for use with high voltage electrical equipment.

It is another object of this invention to provide a water sensing electronic safety control device which will detect the presence of water in the vicinity of said high voltage electrical equipment.

It is still another object of this invention to provide a water sensing electronic safety control device which will automatically and instantaneously shut off the primary power feeding said high voltage electrical equipment when said water is detected.

It is an additional object of this invention to provide a water sensing electronic safety control device which, after having shut off primary power to high voltage equipment due to a water hazard, will prevent restarting said high voltage equipment as long as said water hazard continues to exist.

Additional objects, advantages and features of the invention reside in the construction arrangement and combination of parts involved in the embodiment of the invention as will appear from the following description and accompanying drawings, wherein:

FIG. 3 is a plan view of a typical sensing plate and,

FIG. 4 is a block representation of typical sensing plate installations.

Figure 1:
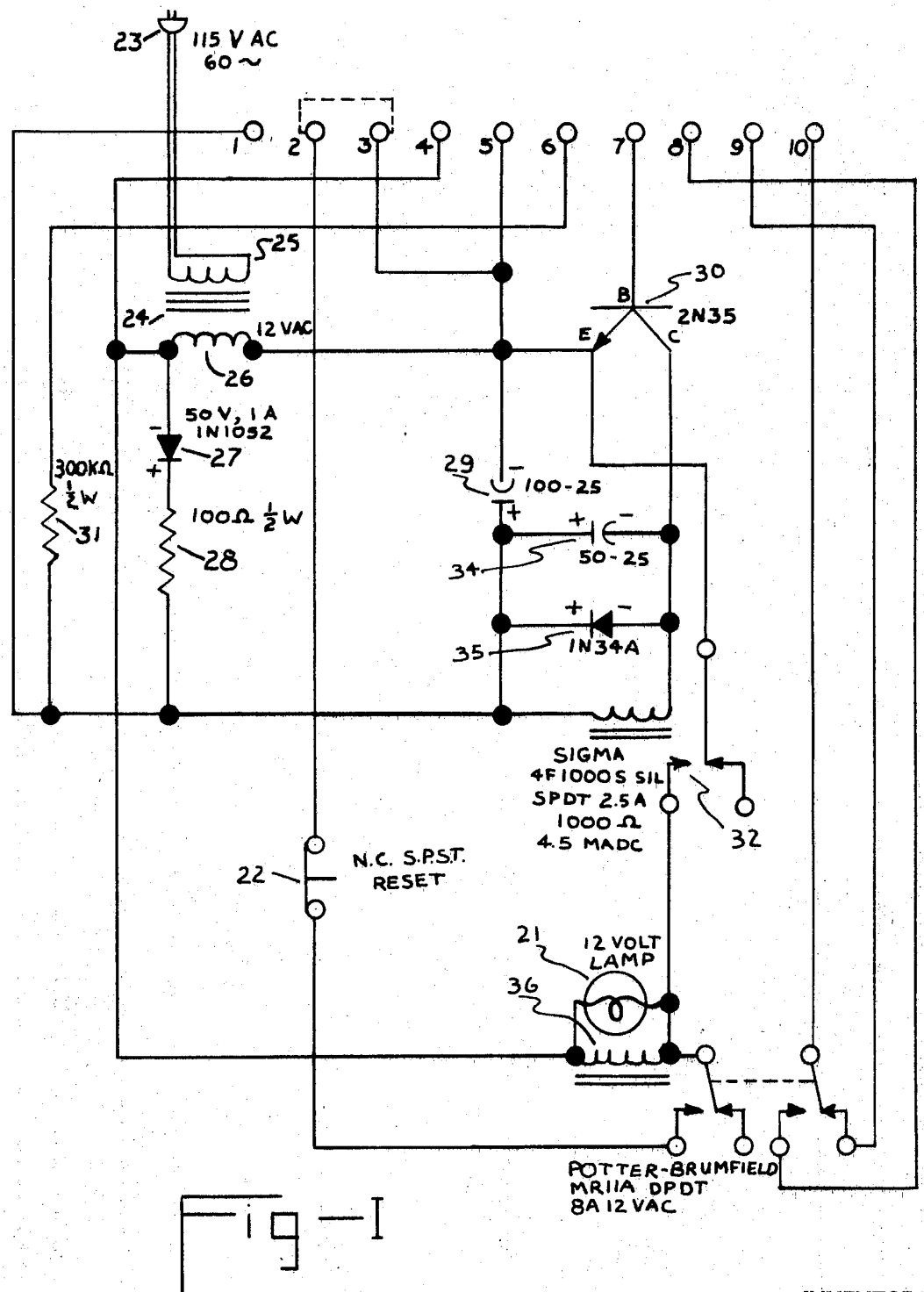
FIG. 1 is a schematic drawing of the control unit circuitry.
Figure 2:
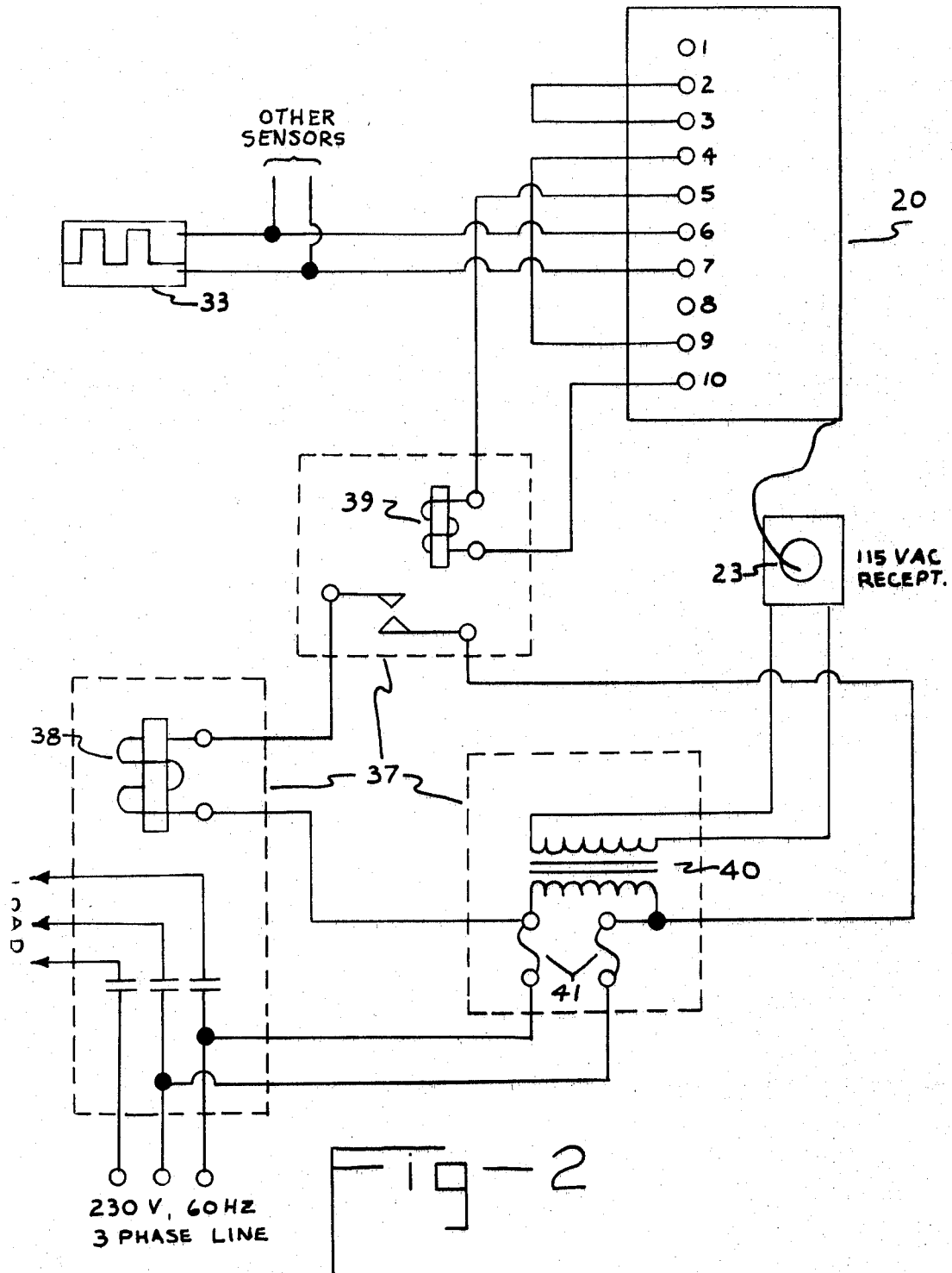
FIG. 2 is a schematic drawing of a typical installation.

Referring primarily to FIG. 1 and FIG. 2, the control unit, which will be referred to as control unit 20, is housed in a ten inch by six inch by three and one-half inch aluminum box. The front panel of said box contains a red indicator lamp 21, a reset button 22 and a ten terminal barrier strip 1–10. All electrical connections to control unit 20 are made to the barrier strip terminals 1–10 except for the 115 VAC line which is connected through a line cord and plug 23. In the interests of increased safety, no electrical potential exceeding eighteen volts appears exposed on barrier strip terminals 1–10.

Transformer 24 is the power transformer of the control unit 20. The primary 25 of transformer 24 connects to the AC line through line cord and plug 23. The twelve volt secondary 26 supplies power within the control unit 20 and is connected to front panel barrier strip terminals 4 and 5 to feed external switching equipment. Diode 27 rectifies the secondary voltage and, along with power supply current limiting resistor 28 and filter capacitor 29, it provides half-wave direct current for the transistor circuit. Transistor 30 is a germanium NPN type connected as a common emitter direct current amplifier with a current gain of approximately one hundred. Normally the transistor is in the cut-off condition with its base returned to the power supply through the base current limiting resistor 31 and the normally high impedance sensor plate terminals 6 and 7. Negligible current flows through collector load relay 32. A drop of water on the sensor plate 33 positively biases the transistor 30 and a nominal base current of 40 microamperes will cause relay 32 to close with collector current at approximately 4.5 milliamperes. Capacitor 34 provides filtering for relay 32; diode 35 blocks back EMF from the relay 32 coil. Relay 36 is pulled in by twelve volts AC through the contacts of relay 32 and is sealed on by one set of its own contacts. The indicator lamp 21 in parallel with the coil of relay 36 indicates that the system has been water activated. The second set of contacts on relay 36 connects with front panel barrier strip terminals 8, 9 and 10 where lead wires for the switching equipment 37 terminate. The system will remain activated until the sensor plates 33 are dry and the manual reset button 22 is pressed, opening the seal in the circuit of relay 36. Barrier strip terminals 2 and 3, which are normally shorted across, permit the use of additional remote normally closed reset pushbuttons, such as 22, wired in series. To add flexibility to the equipment, positive and negative leads from the direct current supply are brought out to front panel barrier strip terminals 1 and 5 respectively. In an installation where several control units are required, their design may be simplified and costs lowered by making them slave units containing no power supply and drawing power from one central complete control unit.

The switching equipment 37 cannot be described in great detail because the requirements are peculiar to the particular high voltage equipment being protected and the type and size of the power service to be switched. In general, it is desirable to use the normally closed barrier strip terminals 9 and 10 to switch an external twelve volt AC relay such as 39, the contacts of which supply power to the holding coil of a large electromagnetic contactor, as 38, which switches the primary power. Line power for the control unit 20 must be supplied from the feed side of the contactor 38. Control transformers 40, contactors 38 and fuses 41 must be supplied in accordance with local electrical codes and good wiring practices.

The sensor plates 33 are pieces of copperclad fiberglass laminated boards, such as are commonly used in the electronic industry for printed circuits, each measuring five by seven by one-sixteenth inches. As shown in FIG. 3 each board has been etched to produce a pattern resembling a series of interlaced fingers which form essentially two parallel copper conductors separated by a one-sixteenth inch wide space. Any water, even a single drop, striking the surface of sensor plate 33 and bridging the gap between the two conductors increases the electrical conductivity to a valve easily sensed by the control unit 20. Any number of sensor plates 33 may be mounted at selected locations in a room or an area to be protected. In a typical installation, as represented in FIG. 4, a hanger rod 42 and insulator 43 are bolted to each sensor plate 33 on the one inch by seven area from which the grid pattern has been purposely omitted to provide for mounting. The assembly is then suspended from a ceiling, or other support, with the copper or sensitive side of the sensor plate 33 positioned so as to receive a direct strike of water droplets from the source being protected against.

We claim:

1. Safety apparatus for anticipating and preventing equipment damage and conditions hazardous to personnel due to the entry of water into an area containing high voltage electrical equipment energized from a primary power source, said apparatus comprising: a plurality of water sensors situated at likely points of water entry into said area so as to be wetted before water reaches said high voltage equipment, said sensors being two-terminal devices having a very high electrical resistance when dry and a much lower electrical resistance when wet; a source of direct current connected in circuit with the sensors; and means in said circuit responsive to current flow from said source through any of said sensors to disconnect the primary power source from said equipment and to maintain the disconnection until an included reset device is manually actuated.

2. Apparatus as claimed in claim 1 in which the last named means comprises: an electromagnetic contactor for connecting said high voltage equipment to the primary power source, said contactor being a normally open switch with a holding electromagnet acting when energized to hold the switch in its closed position; a first relay having a set of normally open contacts and an actuating electromagnet; an energizing circuit for the holding electromagnet of said contactor including the normally open contacts of said first relay; a second relay having a set of normally closed contacts, a set of normally open contacts, and an actuating electromagnet; an energizing circuit for the electromagnet of said first relay including the normally closed contacts of said second relay; a holding circuit for said second relay including the normally open contacts of the relay and a normally closed manually actuatable reset switch; a transistor having its base-emitter path connected in the circuit containing said source of direct current and said sensors whereby current flow from said source through any of said source flows in the said base-emitter path; a third relay having a set of normally open contacts and an actuating electromagnet, the latter connected in the collector circuit of said transistor; and an energizing circuit for the actuating electromagnet of said second relay containing the normally open contacts of said third relay.

3. Apparatus as claimed in claim 2 in which each of said sensors is a plate consisting of a metal clad insulating substrate with the metal etched away along a narrow path shaped to form a pair of interdigitated electrodes, the electrodes constituting the two terminals of the sensor.

References Cited
UNITED STATES PATENTS

| | | | |
|---|---|---|---|
| 2,907,841 | 10/1959 | Campbell | 200—61.05 |
| 3,242,473 | 3/1966 | Shivers, et al. | 200—61.05 XR |
| 3,260,809 | 7/1966 | Leasho | 200—61.04 XR |
| 3,407,337 | 10/1968 | Benham | 317—18 |

WILLIAM M. SHOOP, Jr., Primary Examiner

U.S. Cl. X.R.

200—61.04; 307—118; 317—18